(12) United States Patent
Harwood et al.

(10) Patent No.: US 12,100,855 B2
(45) Date of Patent: Sep. 24, 2024

(54) HERMETICALLY CLOSED BATTERY DEGAS VENTING UNIT FOR A BATTERY ENCLOSURE/PACK/HOUSING

(71) Applicant: MANN+HUMMEL GmbH, Ludwigsburg (DE)

(72) Inventors: Vance Harwood, Oxford, MI (US); Thomas Schleiden, Oberstenfeld (DE); Juergen Kosicki, Erligheim (DE); Joseph Dyer, Portage, MI (US); Matthias Wagner, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 254 days.

(21) Appl. No.: 17/592,694

(22) Filed: Feb. 4, 2022

(65) Prior Publication Data
US 2023/0253668 A1  Aug. 10, 2023

(51) Int. Cl.
*H01M 50/342* (2021.01)
*H01M 50/30* (2021.01)

(52) U.S. Cl.
CPC ...... *H01M 50/3425* (2021.01); *H01M 50/394* (2021.01); *H01M 2220/20* (2013.01)

(58) Field of Classification Search
CPC ........... H01M 50/3425; H01M 220/20; H01M 50/394
See application file for complete search history.

(56) References Cited

U.S. PATENT DOCUMENTS

| 4,345,611 | A  |   | 8/1982  | Ikeda et al. |
| 6,220,269 | B1 | * | 4/2001  | Muddiman ............. F16K 17/16 220/89.3 |
| 2003/0216119 | A1 |   | 11/2003 | Mashiko et al. |
| 2004/0173978 | A1 | * | 9/2004  | Bowen ..................... F16L 23/22 277/650 |
| 2011/0244099 | A1 | * | 10/2011 | Perentes ................. A47J 31/22 99/302 C |
| 2012/0028095 | A1 | * | 2/2012  | Wang .................. H04M 1/0262 429/100 |
| 2012/0040215 | A1 |   | 2/2012  | Zhu et al. |
| 2013/0032219 | A1 | * | 2/2013  | Heim ................ H01M 50/3425 137/197 |
| 2014/0238984 | A1 | * | 8/2014  | Walker ................. B23K 26/364 219/121.72 |
| 2014/0290490 | A1 |   | 10/2014 | Uemura et al. |
| 2016/0036025 | A1 |   | 2/2016  | Hofer |
| 2018/0261814 | A1 |   | 9/2018  | Zacher |

(Continued)

FOREIGN PATENT DOCUMENTS

CN   206098495 U   4/2017
CN   206148512 U   5/2017

(Continued)

*Primary Examiner* — Milton I Cano
*Assistant Examiner* — Albert Michael Hilton (57) ABSTRACT

Disclosed is a hermetically closed battery degas venting unit for venting a battery enclosure/pack/housing having rechargeable vehicle batteries. The unit having a housing base equipped with a non-porous rupturable venting film closing over and sealing off the pressure venting opening. The non-porous venting film configured to deflect towards a spike in response to overpressure and to tear or rupture to release overpressure in the battery enclosure/pack/housing.

13 Claims, 4 Drawing Sheets

(56) References Cited

U.S. PATENT DOCUMENTS

2019/0217573 A1* 7/2019 Chung ................. H05K 1/0393
2020/0388807 A1   12/2020 Zbiral et al.
2021/0280941 A1*  9/2021 Rahmathullah ..... H01M 50/383

FOREIGN PATENT DOCUMENTS

| CN | 206282913  U  | 6/2017 |
| CN | 111341969  A  | 6/2020 |
| DE | 102012022346 A1 | 5/2014 |
| DE | 102015011663 A1 | 7/2016 |
| WO | 2021105052 A1 | 6/2021 |
| WO | 2021110316 A1 | 6/2021 |

* cited by examiner

HERMETICALLY CLOSED BATTERY DEGAS VENTING UNIT FOR A BATTERY ENCLOSURE/PACK/HOUSING

TECHNICAL FIELD

Disclosed is a hermetically closed battery degas venting unit for a battery enclosure/pack/housing having rechargeable vehicle batteries, particularly for an electric vehicle is disclosed. The hermetically closed battery degas venting unit has a housing base equipped with a non-porous rupturable venting film closing over and sealing off the pressure venting opening. The non-porous venting film is configured to impact against a spike in response to overpressure so as to tear or rupture the film to release overpressure in the battery enclosure/pack/housing.

BACKGROUND OF THE INVENTION

Particularly in automotive, public transit, rail and other electric battery powered equipment and vehicles, there are considerable environmental advantages in powering vehicles and equipment from clean electric power which has been provided from "green" energy sources such as wind, ocean waves and solar. In today's world, this is particularly important.

Well known for such applications are lithium-based rechargeable batteries, known for their higher energy storage capabilities and energy storage densities, as well as enhanced charge/discharge cycling and a relatively long useful operating life. Such high energy density cells are known to generate heat while charging and discharging, particularly from the internal battery chemical processes and from the internal resistance of the batteries.

Such vehicles typically have at least one battery enclosure/pack/housing enclosing a plurality of individual battery cells. During discharge or charging of the batteries, heat and or gasses may be generated within the battery enclosure/pack/housing. A battery failure within the battery enclosure/pack/housing may result in considerable heat and gas pressure, overstressing the battery enclosure/pack/housing and endangering drivers and occupants. In such situations, battery enclosure/pack/housing equipment with a degas venting unit can release overpressure condition in while preserving the structural integrity of the battery cells, battery enclosure/pack/housing and internal electrical components.

In the world of electric automobiles, trucks, etc., there remains a need in the art for a hermitically sealed battery degas venting unit, structured to vent at relatively low pressures, having a relatively thin non-porous film which hermetically seals the vent opening of the battery degas venting unit, protecting the interior of the battery enclosure/pack/housing relative to the external environment, thereby preventing gas exchange, or incursion of water or moisture into the battery enclosure/pack/housing.

SUMMARY OF THE INVENTION

As can be understood from the above. there remains a need in the art for a battery degas venting unit that has a relative thin non-porous film which hermitically seals the vent opening of the battery degas venting unit, hermitically sealing the interior of the battery enclosure/pack/housing relative to the environment, thereby preventing gas exchange with the environment and preventing incursion of water or moisture into the battery enclosure/pack/housing.

There remains a need in the art for a battery degas venting unit having a thin non-porous film and housing which together are embodied and configured to rupture the non-porous film at low pressures.

In a primary aspect of the invention, a hermetically closed battery degas venting unit for a battery enclosure/pack/housing is disclosed. The hermetically closed battery degas venting unit having a base housing configured to mount onto a vent opening or a vent duct of a battery enclosure/pack/housing, the base housing having a pressure venting opening in communication with an interior of the battery enclosure/pack/housing. A non-porous venting film is sealably secured onto the base housing, closes over and seals off the pressure venting opening, preventing exchanges between the battery enclosure/pack/housing and the environment. The non-porous venting film is configured to tear or rupture in an overpressure condition, such as from a battery failure or overheating condition, venting the resulting overpressure to an external environment and thereby preserving the structural integrity of the battery enclosure/pack/housing.

The hermetically closed battery degas venting unit includes a spike secured to the base housing and positioned at the pressure venting opening and over the non-porous venting film, the spike spaced away from the non-porous venting film providing distance or space for the non-porous venting film to flex and stretch or tension before impacting against the spike.

The spike advantageously has a pointed tip facing the non-porous venting film and operative to puncture, tear or rupture the film. When a pressure at the battery pressure venting opening exceeds a predefined venting pressure, the non-porous venting film is deflected and stretched to deflect towards and impact against the spike and is destructively ruptured open, thereby opening the pressure venting opening of the base housing to relieve accumulated overpressure from the battery enclosure/pack/housing.

The battery degas venting unit includes a support screen, preferably a metallic support screen, having a plurality of vent holes or slots and arranged adjacent to the relatively thin non-porous venting film. The support screen is positioned between the non-porous venting film and the pressure venting opening of the base housing.

Advantageously, the support screen may be configured with through holes or slot shaped openings having a width of less than 1 mm, preferably 0.9 mm or less for IP (Ingress Protection) as defined by the International Electrotechnical Commission (IEC) Standard 60529—IP69K-D & B and ISO Standard 20653, so as to prevent foreign objects from entering into or escaping from the battery enclosure/pack/housing during or after an overpressure event.

Advantageously, in some aspects of the invention the support screen is configured to operate as a spark arrestor.

Advantageously, the support screen may be configured to support the non-porous venting film, particularly in a negative battery enclosure/pack/housing pressure condition.

Preferably the vent opening and the non-porous venting film of the battery degas venting unit is completely covered by the cap, with the exception of a gap between the cover and the housing base.

Preferably the spike bridge having the spike extends over the non-porous venting film and engages into cap and projects through spike bridge engagement opening provided in the cap. In some variations of the invention, the spike bridge is U-shaped with an outer bridge portion of the U-shaped bridge projecting through the cap.

In a preferred aspect of the invention, the hermetically closed battery degas venting unit the cap secured onto the second side of the base housing and covering over the non-porous venting film and the spike, as well as covering over the venting opening of the housing base. The cap may include at least one alignment member, such as a projecting pin or snap catch configured to position and attach the cap onto the base housing. For this, the base housing includes at least one cap alignment member, or a receptacle arranged on the second side of the base housing facing the cap. Advantageously, the at least one alignment member of the cap engages with the at least one cap alignment receptacle to align the hold the cap in a predetermined position on the base housing.

In another aspect of the invention, the cap includes at least one alignment wing projecting outwardly from the cap, the at least one at least one alignment wing preferably having a slot configured to engage a mounting member of the base housing. The mounting member of the housing base may be configured as at least one snap hook. Advantageously the at least one snap hook may be configured to firmly engage with the at least one alignment wing of the cap so as to secure the cap onto the base housing. The cap is not intended to be removable from the housing, for this reason—The non-porous venting film is thin and fragile and may be easily damaged by, for example, contact with a human finger or tool if the cap be removed exposing the non-porous venting film. The secure attachment of the cap to the base housing advantageously covers over and protects the fragile non-porous venting film from damage as might occur if touched by a finger or a tool.

In at least some aspects of the invention, the hermetically closed battery degas venting unit may include the spike bridge fixed onto the second side of the base housing, facing the cap, and extending over the non-porous venting film. Advantageously, the spike is arranged on the spike bridge and elevated away from the non-porous venting film.

In a preferred aspect of the invention, the spike may advantageously include at least one knife-like wing formed on and projecting radially outwardly from an outer circumference of the spike. The at least one knife-like wing advantageously configured to initiate or encourage a tear along a preferred rupture line on the non-porous venting film to further enable a repeatable low-pressure rupture of the non-porous venting film when the pressure at the battery pressure venting opening exceeds the predefined venting pressure.

In some aspects of the invention, the non-porous venting film may be adhesively fixed onto and sealed to the base housing, such that the non-porous venting film forms a hermetic seal of the vent opening, hermetically sealing the pressure venting opening until the non-porous venting film is ruptured in an overpressure condition.

The cap may include at least one spike bridge engaging slot extending through the cap from an interior or and exterior. Advantageously, at least a portion of the spike bridge is received into and projects outwardly through the at least one spike bridge engaging slot such that the spike bridge supportively engages with the cap. The at least one spike bridge engaging slot of the cap permits greater spacing of the spike and the spike bridge away from the non-porous venting film. The greater spacing allowing for greater deflection and initial tensioning of the non-porous venting film for improved impact against the spike to provide improved low-pressure rupture of the non-porous venting film.

In some preferred aspects of the invention, the non-porous venting film is a non-porous PTFE film, having a very thin film thickness between 2 and 30 microns, preferably between 8 and 15 microns, the PTFE material thickness itself and material properties have been established in testing so as to provide a repeatable low-pressure rupture of the non-porous venting film against the spike at a pre-selected rupture pressure between 5 to 40 kPa, in preferred embodiments the pre-selected rupture pressure is more preferably between 10 to 30 kPa. The volume enclosed between the non-porous venting film and the underside of the cap influences the rupture pressure the non-porous venting film, specifically as a larger volume and depth under the cap give more space for the non-porous venting film to deflect, stretch and tension. Increasing the volume increases the amount of tension in the deflected non-porous venting film, and acts to lower the rupture pressure. In this way, the rupture pressure of the non-porous venting film can be adjusted by enlarging or decreasing the enclosed the volume and depth between the underside of the cap and the non-porous venting film.

Preferably the cap includes at least one water intrusion blocking wall arranged on a circumference of the cap and projecting towards the second side of the base housing. Preferably a gap or open space of between 1 mm to 5 mm is formed between the at least one water intrusion blocking wall and the base housing providing pressure equalization venting of the interior the cap through the gap to the external environment.

In some aspects of the invention, the cap is adapted and configured to destructively release from the base housing during a pressure release to provide a full vent opening cross-section for flow that is unrestricted by the cap.

In another preferred aspect of the invention, the non-porous venting film is a non-porous polypropylene film. Due to the stiffness of the non-porous polypropylene film material, compared to the PTFE film, the non-porous polypropylene film is provided with scored or laser etched break lines, etched in pattern on the on-porous polypropylene film forming scores partially penetrating a thickness of the venting film so as to weaken the non-porous polypropylene film to rupture along the scored or laser etch break line at low pressures, 5 to 50 kPa, preferably 10-40 kPa, more preferably 10 to 30 kPa. The pattern may be selected from a pattern set consisting of: "S" shaped, "X" shaped, curved, serpentine, or straight lines, or combinations of these.

When the non-porous venting film is the relatively thin and fragile non-porous PTFE film of the present invention (configured such for low burst pressure), the non-porous PTFE film is preferably bonded onto the film mounting ledge with a double coated adhesive tape arranged between the non-porous venting film and the film mounting ledge and sealing the non-porous PTFE film to the film mounting ledge. We have found use of a 0.025 (0.6 mm) high tact adhesive backed tape with its strong high initial adhesive tact to be particularly suitable. However, due to the fragility of the very thin non-porous PTFE film, the non-porous PTFE film cannot be suitably welded onto the film mounting ledge. However, when the non-porous venting film is the thicker laser etched or scored non-porous polypropylene film, the non-porous venting film is preferably sonically welded onto the film mounting ledge, sealing the non-porous film to the film mounting ledge.

In a further advantageous aspect of the invention, the at least one knife-like wing of the spike may be positioned to aligned with a scored or laser etched break line of the non-porous polypropylene film to enable and encourage the tear or rupture along the preferred pattern break lines on the non-porous venting film, further enabling a predictable, controlled repeatable low-pressure rupture of the non-porous venting film.

In a further advantageous aspect of the invention, the non-porous polypropylene film has a film thickness, independent of the laser etching and scoring, of between 20 and 100 microns, preferably between 30 microns and 60 microns.

Preferably the spike bridge engages into and projects through the cap through the at least one spike bridge engaging slot, thereby structurally linking and supporting the spike bridge and the cap on the base housing while, permitting a greater spacing and film flexure depth inside the cap.

Preferably the water intrusion blocking walls of the cap are received into an annular ring or socket or groove provided on the base housing to form a gap or spacing when is protected or hidden in the annular ring or socket, permitting pressure equalization and venting while countering entry of water, liquids, chemical vapors or dust into the cap and reaching the non-porous venting film.

Preferably the housing base includes at least one snap hook projecting outwardly from the housing base and engaging into the slots of the slotted attachment wings of the cap, to releasably mount the cap onto the housing base.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a hermetically closed battery degas venting unit for a battery enclosure/pack/housing. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The discussion below is in reference to FIGS. 1-5, presented earlier above.

The hermetically closed battery degas venting unit 10 has a base housing 12 having a housing mounting face 48 at a first side of the base housing 12. A pressure venting opening 56 is arranged at the first side of the base housing 12 and extends through the base housing 12 from the housing mount face 48 to second side 50 of the base housing 12.

A film mounting ledge 58 circumferentially surrounds the pressure venting opening 56 and provides a sealing surface on which the non-porous venting film 28 is seal ably fixed, thereby proving a gas impermeable hermetic seal of the pressure venting opening 56 during normal use in normal operation.

Figure 1:
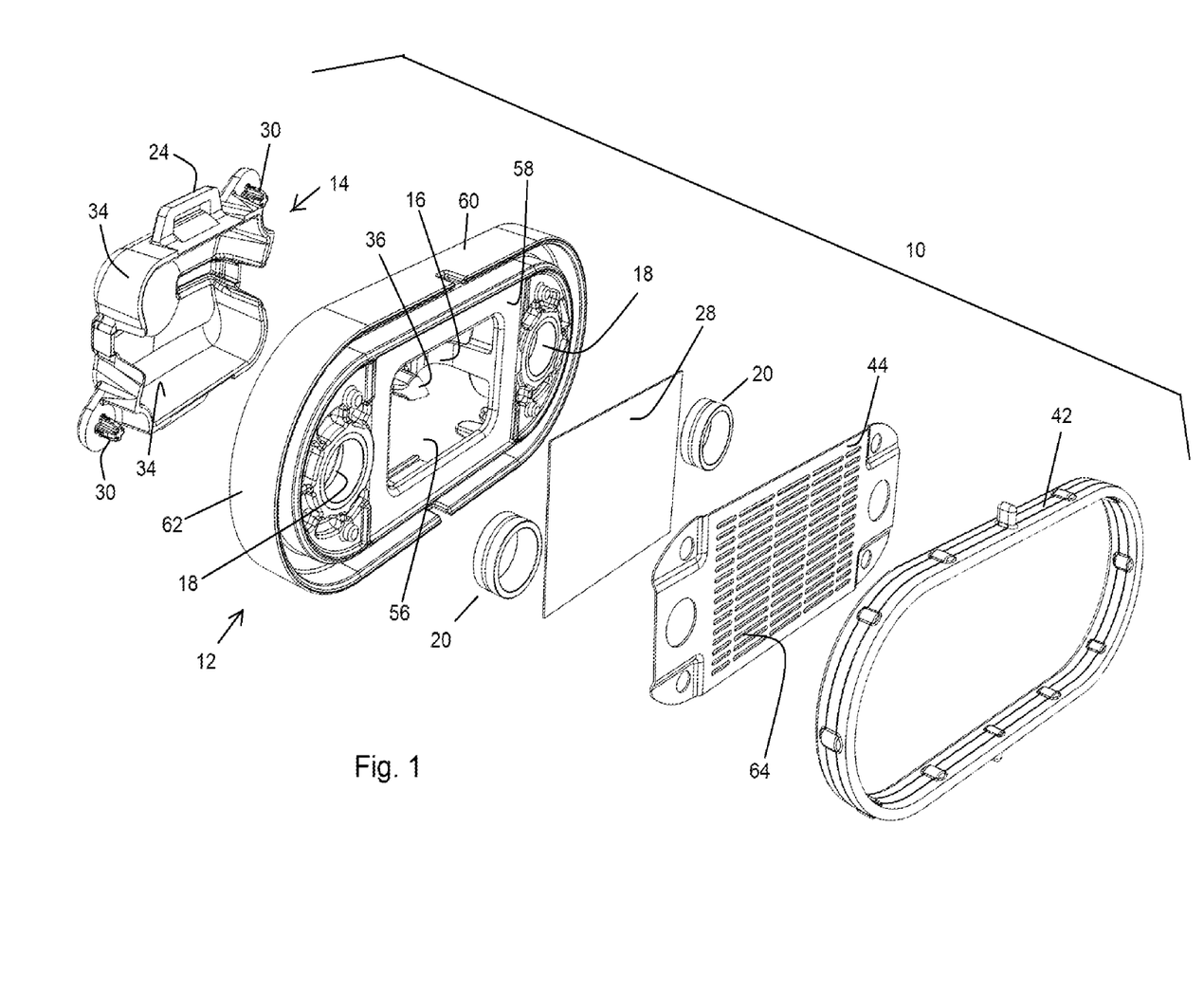
FIG. 1 is an exploded assembly view of one embodiment of a hermetically closed battery degas venting unit, consistent with the present inventive disclosure.
Figure 2:
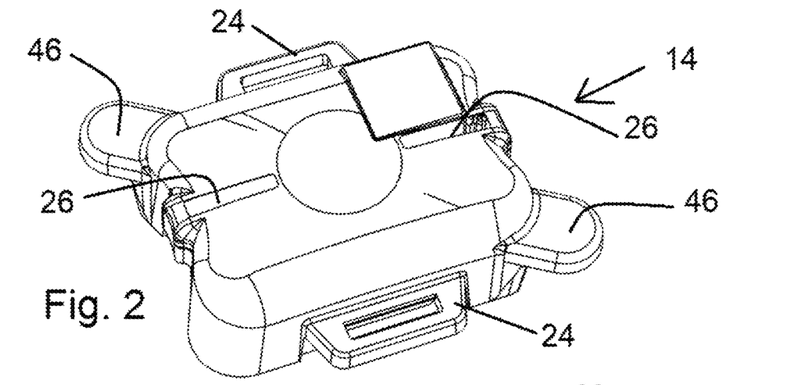
FIG. 2 is a top perspective view of the cap of FIG. 1, configured to detachably mount onto the housing base of the hermetically closed battery degas venting unit, and protectively close over the spike and the non-porous venting film, consistent with the present inventive disclosure.
Figure 3A:
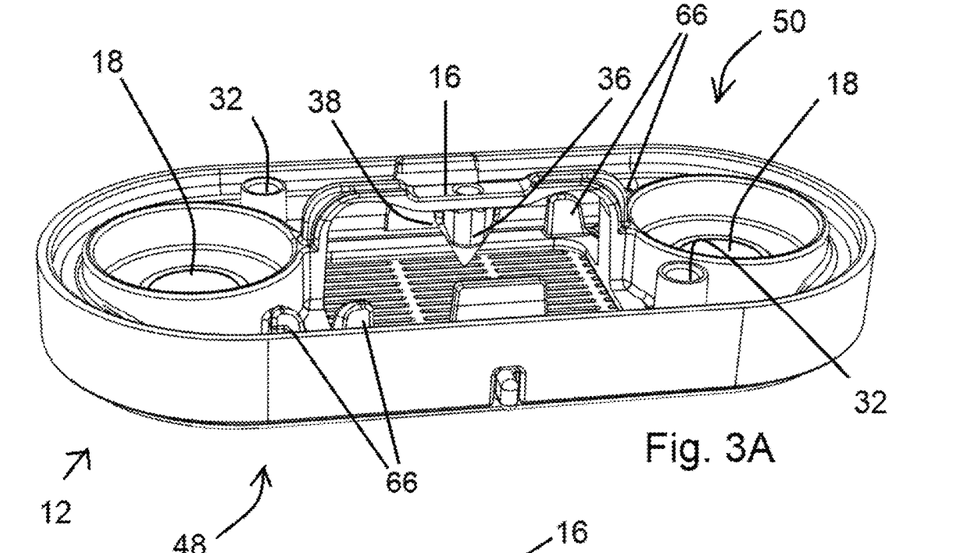
FIG. 3A is a side perspective view of the housing base of FIG. 1, depicting features of the housing base, showing the spike with spike wings on the spike bridge and the cap alignment post receptacles, among other things.
Figure 3B:
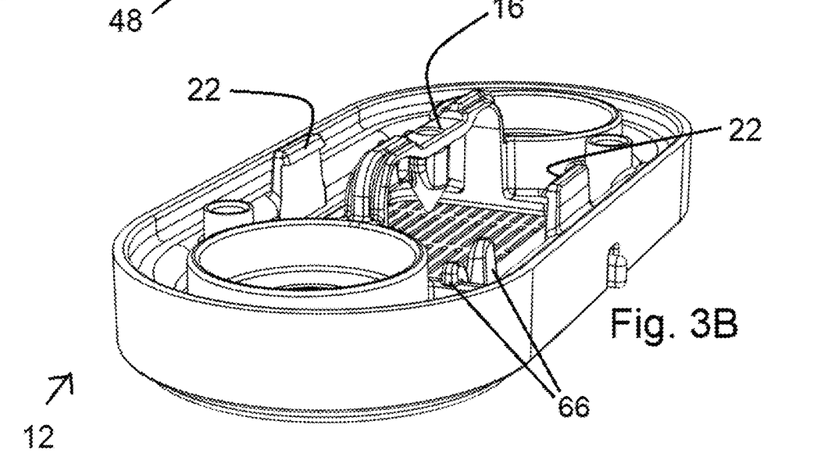
FIG. 3B is a rotated side view of FIG. 3A, rotated to provide view the features of FIG. 3A at a different angle for better understanding the claimed structure.
Figure 4A:
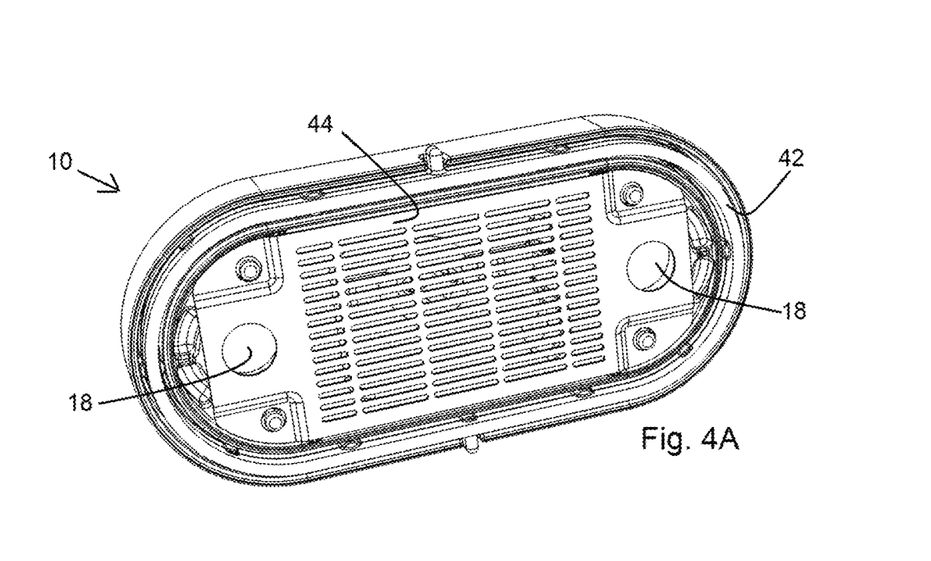
FIG. 4A illustrates the housing mounting face at the first side of the hermetically closed battery degas venting unit, depicting the support screen and housing holes and other features, consistent with the present inventive disclosure.
Figure 4B:
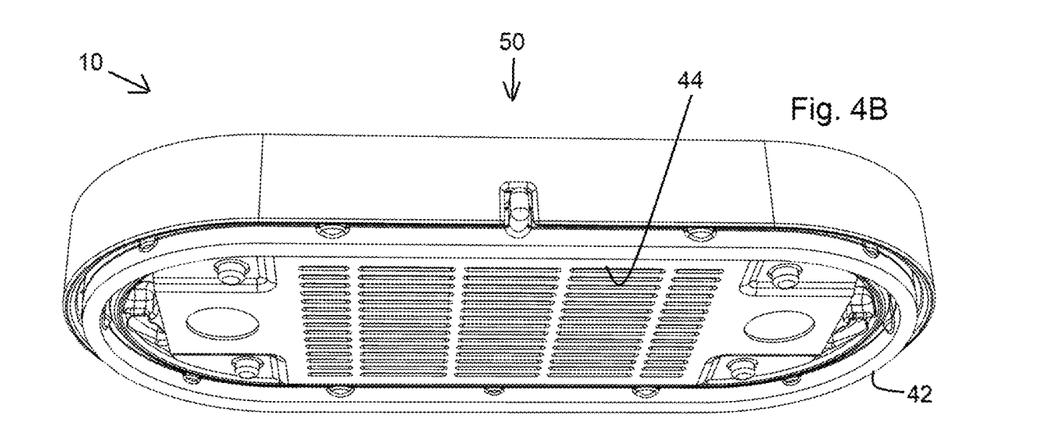
FIG. 4B illustrates a side perspective view of the housing mounting face of the hermetically closed battery degas venting unit, depicting claimed features, consistent with the present inventive disclosure.
Figure 5:
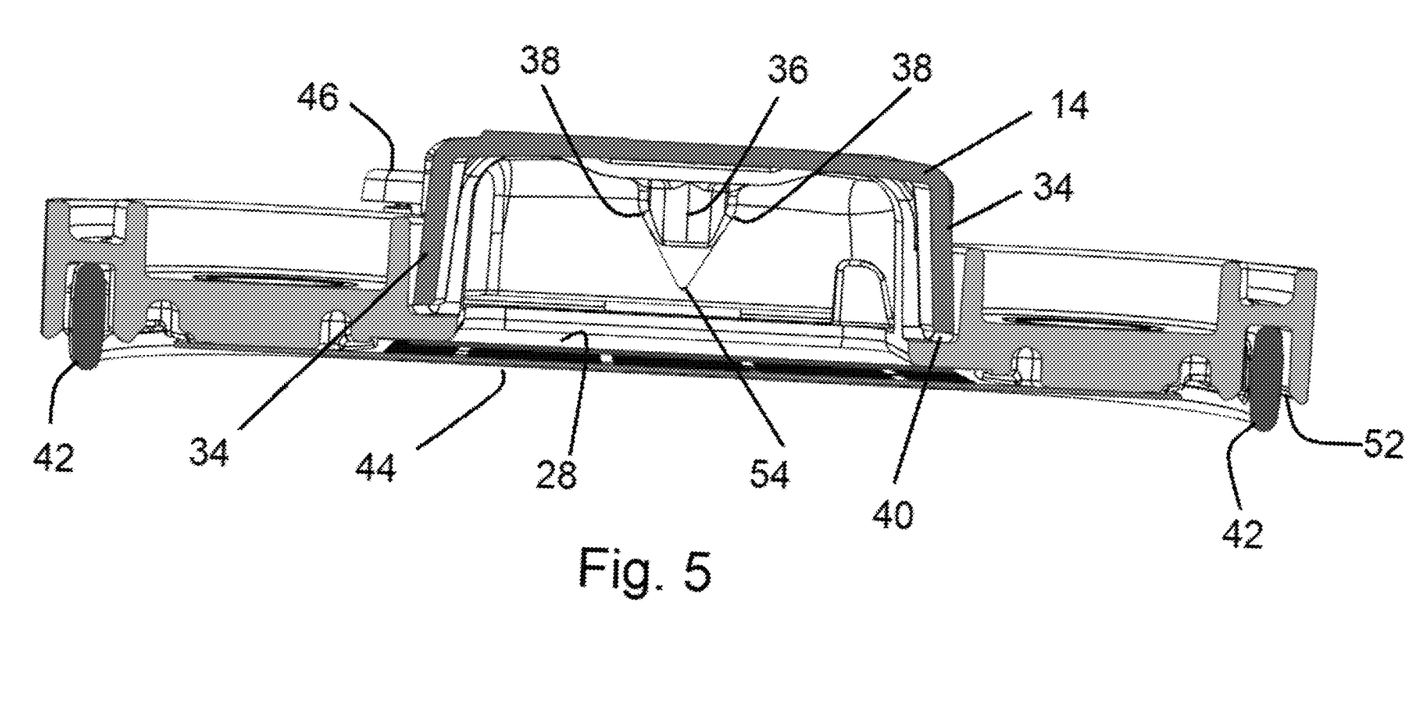
FIG. 5 depicts a sectional view of the hermetically closed battery degas venting unit of FIG. 1, the section taken parallel to the longer side of the housing base and illustrating the cap mounted of the housing base with the spike bridge and spike the non-porous venting film mounted above the support screen and other features of the inventive disclosure.

As shown in FIG. 1, the base housing 12 has substantially flat longitudinal side walls 60 connecting two opposing curved or semi-circular end walls 62. Mounting holes 18 are provided extending through the housing base 12 from the housing mount face 48 to second side 50 of the base housing 12 for receiving mounting fasteners, for example bolts or screws, to mount the hermetically closed battery degas venting unit 10 onto a vent opening or vent duct of the battery enclosure/pack/housing being protected.

To support the base housing 12 against compressive forces of the mounting fasteners, tubular, preferably metallic compression limiters 20 are arranged in mounting holes 18 and held in place by a press fit or preferably molded into material of the housing base 12.

The non-porous venting film 28 is sealably fixed to the film mounting ledge 58 and sealably closes the pressure venting opening 56, forming a gas-tight seal hermetic seal. When the non-porous venting film 28 is the relatively thin and fragile non-porous PTFE film of the present invention (configured such for low burst pressure), the non-porous PTFE film is preferably bonded onto the film mounting ledge 58 with a double coated adhesive tape arranged between the non-porous venting film 28 and the film mounting ledge 58 and sealing the non-porous PTFE film to the film mounting ledge 58. We have found the 0.025 (0.6 mm) high tact adhesive backed tape with its strong high initial adhesive tact to be particularly suitable with the fragile PTFE film. However, due to the fragility of the very thin non-porous PTFE film, the non-porous PTFE film cannot be suitably welded onto the film mounting ledge 58.

However, when the non-porous venting film 28 is the thicker laser etched or scored non-porous polypropylene film, the non-porous venting film 28 is preferably sonically welded onto the film mounting ledge 58, sealing the non-porous film 28 to the film mounting ledge.

In the event of an overpressure condition in the battery enclosure/pack/housing, the non-porous venting film 28 is configured to tear or rupture to release overpressure through the hermetically closed battery degas venting unit 10, as described later below.

The base housing 12 may include a seal ring groove 52 into which a seal ring 42 is received and supportively held. The seal ring 42 is preferably elastomeric and is configured to tightly seal the hermetically closed battery degas venting unit 10 to the battery enclosure/pack/housing.

A spike 16 is secured to the base housing 12 and positioned within the pressure venting opening 56 and over the non-porous venting film 28. The spike 16 is spaced away from the non-porous venting film 28, providing a predefined film flexure or travel distance between the at-rest position of the non-porous venting film 28 at the support screen, and the spike 36. The spike 16 has a pointed tip 54 facing the non-porous venting film 28.

When a pressure at the battery pressure venting opening exceeds a predefined venting pressure, the non-porous venting film is deflected by the force of the pressure to deform and stretch to deflect towards and impact against spike 36 and to be destructively ruptured open, thereby opening the pressure venting opening 56 of the base housing 12 to flow.

A support screen 44 having a plurality of holes 64 or slots is arranged proximate to the first side 48 of the base housing 12 and proximate to the non-porous venting film 28, such that the non-porous venting film 28 is positioned between the support screen 44 and the film mounting ledge 56 of the base housing 12. Preferably the support screen is a metallic screen or a plate having a plurality of holes of slots 64. The support screen 44 may include one or more mounting holes through which fasteners extend to mount the support screen 44 onto the base housing 12. Preferably the support screen 44 is configured and positioned to support the non-porous venting film 28 when in a battery enclosure/pack/housing under pressure condition. The support screen 44 is preferably secured to remain in place after a degas event to prevent foreign objects from entering the battery enclosure/pack. The support screen 44 is preferably held in place by mounting fasteners.

A cap 14 is removably secured onto the second side 50 of the base housing 12 and covers over the non-porous venting film 28 and the spike 36. The cap may include one or more alignment member, for one example, alignment posts 30 form as projections on the cap and positioned to engage into complimentary alignment receptacle 32 of the base housing 12, thereby fixing the position of the cap 14 on the base housing 12. The at least one alignment member 30 of the cap 14 engages with the at least one cap alignment receptacle 32 to align the hold the cap in a predetermined position on the base housing 12. On corners of the cap 14 which do not have alignment posts 30, the base housing may include alignment guides 66, formed as a pair of projections on the base housing 12 and contacting the housing, to further guide and enforce proper alignment of the cap 14 during installation.

In some cases, the cap 14 may include at least one alignment wing 24 projecting outwardly from the cap 14. The base housing 12 may include at least one snap hook 22 formed on the base housing 12, the at least one snap hook 22 configured to detachably engage the at least one alignment wing 24 of the cap 14 to detachably and removably fasten the cap 14 to the base housing 12.

A spike bridge 16 is fixed onto or formed onto the second side 59 of the base housing 12 and extends over the non-porous venting film 28. The spike 36 is arranged on the spike bridge 16 and facing the non-porous venting film 28. Preferably the spike bridge 16 is attached to the base housing 12 by a support structure, for example two legs spaced apart across the venting opening, thereby leaving the volume substantially open between the cap 14 and the non-porous venting film 28, allowing the non-porous venting film 28 to be substantially unrestricted when deflecting and stretching and thereby enabling a lower rupture or burst pressure than would otherwise occur.

Preferably, the spike 36 includes one or more knife-like wing 38 which are formed with or formed onto and projecting radially outwardly from an outer circumference of the spike 36. Preferably the at least one knife-like wing 38 has an outer edge configured to further enable a repeatable low-pressure rupture of the non-porous venting film 28 when the pressure at the battery pressure venting opening exceeds the predefined venting pressure.

Preferably, the cap 14 may include at least one spike bridge engaging slot 26, wherein at least a portion of the spike bridge 16 is received into and projects outwardly through the at least one spike bridge engaging slot 26 such that the spike bridge 16 is supportively engaged with and is held by the cap. Advantageously, the at least one spike bridge engaging slot 26 allows for a deeper draw distance of the non-porous venting film 12 before impacting against the spike 36 to thereby be destructively ruptured open. The deeper draw distance provided without increasing the outer dimensions of the hermetically closed battery degas venting unit 10, which is advantageous in constrained mounting space.

In a some preferred aspect of the invention, the non-porous venting film 28 is a non-porous PTFE film, preferably flat and preferably rectangular. Due to the stiffness of PTFE, the non-porous PTFE film is very thin, having a film thickness between 10 and 15 microns, preferably 12.5 microns, selected such that he non-porous venting film 28 is configured to be ruptured at a rupture pressure of less than 40 kPa, preferably between 5-30 kPa, more preferably 5 to 20 kPa.

In a preferred aspect of the invention, the cap 14 includes at least one water intrusion blocking wall 34 arranged on or proximate to an outer circumference of the cap 14 and projecting towards the second side 50 of the base housing 12. A gap or spacing 40 of preferably between 1 mm to 5 mm is formed between the at least one water intrusion blocking wall 34 and the base housing 12, the gap or spacing 40 providing pressure equalization venting of the interior the cap 14 to the external environment. The at least one water intrusion blocking wall 34 of the cap 14 may be received into an at least partially annular ring or socket of the base housing 12 with the gap or spacing which is hidden in the annular ring or socket, thereby permitting pressure equalization and venting while hiding and covering the non-porous venting film 28, protecting the non-porous venting film 28 from high pressure water sprays, such as a car wash and acting to inhibiting water, chemical or dust intrusion from reaching the non-porous venting film 28 and the interior of the cap 14.

In another advantageous aspect of the invention, the cap 14 may be advantageously configured to destructively release from the base housing during a pressure release to provide a full vent opening unrestricted by the cap. In some aspects of the invention, this process may be aided by the high temperature released gases, which is operable to meltably release the cap 14, thereby quickly opening the full cross section of the pressure vent opening 16 to flow.

In another preferred aspect of the invention, the non-porous venting film 28 is a non-porous polypropylene film. The non-porous polypropylene film has a thickness between 20 and 100 microns, preferably between 30 and 100 microns. To achieve the very low bust pressure requirements, the non-porous polypropylene film includes laser etched lines forming grooves which thin the non-porous polypropylene film along the laser etches lines, the laser etched lines etched into a pattern to weaken the non-porous polypropylene film to rupture along the laser etch lines. The pattern is selected from a pattern set consisting of: "S" shaped, "X" shaped, curved, dashed, serpentine or straight lines, or combinations of these.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A hermetically closed battery degas venting unit for battery enclosure/pack/housing, comprising:
a base housing comprising:
  a housing mounting face at a first side of the base housing;
    a pressure venting opening arranged at the first side of the base housing and extending through the base housing from the housing mount face to a second side of the base housing;
    a non-porous venting film closing over and sealing off the pressure venting opening, the non-porous venting film configured to tear or rupture to release gas pressure through the battery enclosure/pack/housing to an external environment;
    a support screen having a plurality of holes or slots, the support screen arranged between the non-porous venting film and the pressure venting opening of the first side of the base housing;
the housing further comprising:
  a U-shaped spike bridge formed onto or secured onto the second side of the base housing, the U-shaped spike bridge formed by:
    two legs, each arranged at opposite sides of the pressure venting opening and fixed onto the base housing, the legs extending outwardly away from the base housing; and
    a bridge member connected at opposite ends to a respective one of the two legs, the bridge member extending over the venting film;
  a spike secured to the bridge member of the U-shaped bridge of the base housing and positioned at the pressure venting opening over the venting film, the spike spaced away from the venting film, wherein the spike has a pointed tip facing the non-porous venting film;
  wherein when a pressure at a battery pressure venting opening exceeds a predefined venting pressure, the venting film is deflected towards the spike and destructively ruptured open, thereby opening the pressure venting opening of the base housing to flow and
  a cap secured onto the second side of the base housing, the cap arranged on and engaging the U-shaped spike bridge, the cap covering over the non-porous venting film and the spike, the cap including:
    at least one spike bridge engaging slot,
    wherein the spike bridge supportively engages into the at least one spike bridge engaging slot of the cap;
  wherein the cap is held by the spike bridge in a position spaced away from the base housing, the spacing forming a pressure equalization gap between the base housing and the cap.

2. The hermetically closed battery degas venting unit according to claim 1, wherein
the cap includes at least one alignment member;
wherein the base housing includes at least one cap alignment receptacle arranged on the second side of the base housing;
wherein the at least one alignment member of the cap engages with the at least one cap alignment receptacle to align the cap in a predetermined position in relation to base housing.

3. The hermetically closed battery degas venting unit according to claim 1, wherein
the cap further includes:
  at least one alignment wing projecting outwardly from the cap, the at least one at least one alignment wing having a slot;
  wherein the base housing includes at least one snap hook formed on the base housing, the at least one snap hook detachably engaging the at least one alignment wing of the cap to detachably and removably fasten the cap to the base housing.

4. The hermetically closed battery degas venting unit according to claim 1, wherein
the spike further comprises at least one knife-like wing formed on and projecting radially outwardly from an outer circumference of the spike,
wherein the at least one knife-like wing is configured to further enable a repeatable low-pressure rupture of the non-porous venting film when the pressure at the battery pressure venting opening exceeds the predefined venting pressure.

5. The hermetically closed battery degas venting unit according to claim 1, wherein
non-porous venting film is fixed onto and sealed to the base housing, wherein the non-porous venting film hermetically seals the pressure venting opening until the non-porous venting film is ruptured.

6. The hermetically closed battery degas venting unit according to claim 1, wherein
the non-porous venting film is a non-porous PTFE film;
wherein the non-porous PTFE film has a film thickness between 10 and 15 microns;
wherein the non-porous venting film is configured to be ruptured at a rupture pressure of between 5 to 40 kPa.

7. The hermetically closed battery degas venting unit according to claim 1, wherein
the cap includes at least one water intrusion blocking wall arranged on a circumference of the cap and projecting towards the second side of the base housing and received behind a wall of the base housing;
wherein the pressure equalization gap is formed by the spacing of between 1 mm to 5 mm between the at least one water intrusion blocking wall of the cap and the base housing, the pressure equalization gap providing pressure equalization venting of the interior the cap to the external environment.

8. The hermetically closed battery degas venting unit according to claim 1, wherein
the cap is configured to destructively release from the base housing during a pressure release to provide a full vent opening unrestricted by the cap.

9. The hermetically closed battery degas venting unit according to claim 1, wherein
the non-porous venting film is a non-porous polypropylene film;
wherein the non-porous polypropylene film is laser etched lines, etched in pattern to weaken the non-porous polypropylene film to rupture along the laser etch lines;
wherein the pattern is selected from a pattern set consisting of: "S" shaped, "X" shaped, dashed and straight lines, or combinations of these.

10. The hermetically closed battery degas venting unit according to claim 9, wherein
the non-porous polypropylene film has a thickness between 20 microns and 100 microns.

11. The hermetically closed battery degas venting unit according to claim 7, wherein
the at least one water intrusion blocking wall of the cap is received into and behind an annular ring or socket of the base housing such that the pressure equalization gap is hidden in and protected by the annular ring or socket, permitting pressure equalization and venting while annular ring or socket and the at least one water intrusion blocking wall cooperate to block water sprays, chemical vapor or dust intrusion from reaching and compromising the non-porous venting film in the interior of the cap.

12. The hermetically closed battery degas venting unit according to claim 1, wherein
the plurality of holes or slots of the support screen have a width of <1 mm in compliance with IP (Ingress Protection) as defined by the International Electrotechnical Commission (IEC) Standard 60529—IP69K-D & B and ISO Standard 20653 so as to inhibit foreign objects from entering into or escaping from the battery enclosure/pack/housing through the support screen during or after an overpressure event.

13. The hermetically closed battery degas venting unit according to claim 12, wherein
the support screen is configured to function as a spark arrestor and to protect from any foreign objects from entering the battery enclosure after an overpressure event has occurred.

* * * * *